United States Patent [19]

Fling et al.

[11] Patent Number: 5,108,183
[45] Date of Patent: Apr. 28, 1992

[54] INTERFEROMETER UTILIZING SUPERFLUORESCENT OPTICAL SOURCE

[75] Inventors: John J. Fling, Gaviota, Calif.; Byoung Y. Kim, Seoul, Rep. of Korea; Kenneth A. Fesler, Sunnyvale, Calif.; Michel J. F. Digonnet, Palo Alto, Calif.; Herbert J. Shaw, Stanford, Calif.

[73] Assignee: The Board of Trustees of the Leland Stanford Junior University, Stanford, Calif.

[21] Appl. No.: 565,248

[22] Filed: Aug. 9, 1990

Related U.S. Application Data

[63] Continuation-in-part of Ser. No. 401,225, Aug. 31, 1989, abandoned.

[51] Int. Cl.$^5$ ............................................. G01C 19/72
[52] U.S. Cl. ........................................ 356/350; 372/1; 372/6
[58] Field of Search ................. 356/350; 372/1, 6, 69, 372/94; 250/227.27

[56] References Cited

U.S. PATENT DOCUMENTS

| | | |
|---|---|---|
| 3,826,992 | 7/1974 | Friedl . |
| 4,410,275 | 10/1983 | Shaw et al. . |
| 4,456,377 | 6/1984 | Shaw et al. . |
| 4,529,312 | 7/1985 | Pavlath et al. . |
| 4,529,313 | 7/1985 | Petermann et al. . |
| 4,536,058 | 9/1985 | Shaw et al. . |
| 4,546,476 | 10/1985 | Shaw et al. ............................ 372/6 |
| 4,556,279 | 12/1985 | Shaw et al. . |
| 4,637,025 | 1/1987 | Snitzer et al. ......................... 372/1 |
| 4,637,722 | 1/1987 | Kim . |
| 4,671,658 | 6/1987 | Shaw et al. . |
| 4,687,330 | 9/1987 | Lefevre . |
| 4,779,975 | 10/1988 | Kim . |
| 4,815,079 | 3/1989 | Snitzer et al. ......................... 372/6 |
| 4,836,676 | 6/1989 | Kim et al. . |
| 4,842,409 | 6/1989 | Arditty et al. . |
| 4,848,910 | 7/1989 | Dupraz . |
| 4,859,016 | 8/1989 | Shaw et al. ............................ 372/6 |
| 4,881,817 | 11/1989 | Kim et al. . |
| 4,938,556 | 7/1990 | Digonnet et al. ........................ 372/6 |
| 4,964,131 | 10/1990 | Liu et al. ................................ 372/6 |

OTHER PUBLICATIONS

E. Desurvire, "Analysis of Transient Gain Saturation and Recovery in Erbium-Doped Fiber Amplifiers", IEEE Photonics Technology Letters, vol. 1, No. 8, Aug. 1989, pp. 196-199.

M. J. F. Digonnet et al., "Analysis of a 1060 nm Nd:SiO$_2$ Superfluorescent Fiber Laser", IEEE Journal of Lightwave Technology, vol. 7, Jul. 1989, pp. 1009-1015.

(List continued on next page.)

Primary Examiner—Samuel A. Turner
Attorney, Agent, or Firm—Knobbe, Martens, Olson & Bear

[57] ABSTRACT

An improved broadband light source for a Sagnac interferometer includes a waveguide, such as a fluorescent optical fiber, that is pumped by a pump source with a sufficient intensity to generate temporally incoherent light. The fluorescent optical fiber has first and second ends, one end being an input end of the fiber. The broadband light is provided at an output of the fluorescent optical fiber and is input to the interferometer. In order to prevent laser oscillations between the light source and the interferometer, one end of the fluorescent optical fiber is formed so as to prevent reflections. The light output from the fluorescent fiber to the interferometer comprises only that light that initially propagates toward the output of the optical fiber. In one embodiment of the light source, the pump light from the pump source is coupled into the fluorescent optical fiber in a direction so that it travels away from the output of the fluorescent optical fiber towards the first end. In an alternative embodiment, the fluorescent optical fiber is a doubly clad optical fiber having a first acceptance region and a second acceptance region at the first end. The pump light is introduced into an aperture window between the two acceptance regions so that the pump light can be introduced into the first end at an angle without requiring a reflective surface at the first end.

24 Claims, 12 Drawing Sheets

OTHER PUBLICATIONS

M. J. F. Digonnet, "Theory of Operation of Three- and Four-Level Fiber Amplifiers and Sources", SPIE, vol. 1171, Fiber Laser Sources and Amplifiers, 1989, pp. 8-26.

K. A. Fesler et al., "Behavior of Broadband Fiber Sources in a Fiber Gyroscope", SPIE, vol. 1171, Fiber Laser Sources and Amplifiers, 1989, pp. 346-352.

K. A. Fesler et al., "Fiber Gyro Experiment Using Fiber Laser Source", Electronics Letters, vol. 25,8, Apr. 13, 1989, pp. 534-536.

K. A. Fesler et al., "Stable Fiber-Source Gyroscopes", Optics Letters, Mar. 21, 1990, pp. 1321-1323.

B. Y. Kim, "Fiber-Optic Device Research at Stanford University", SPIE, vol. 1169, Fiber Optic and Laser Sensors VII, pp. 10-15.

K. Liu et al., "Broadband Fiber Lasers", Abstract of oral presentation presented at Optical Society of America Annual Meeting, Santa Clara, Calif., Oct. 31-Nov. 4, 1988.

K. Liu et al., "Broadband Diode-Pumped Fiber Laser", Electronics Letters, vol. 24,14, Jul. 7, 1988, pp. 838-840.

P. R. Morkel et al., "Erbium-Doped Fibre Superfluorescent Source for the Fibre Gyroscope", Optical Fiber Sensors, pp. 143-148.

H. Po et al., "Double Clad High Brightness Nd Fiber Laser Pumped by GaAlAs Phased Array", Optical Fiber Communication Conference (OFC '89), Houston, Tex., Feb. 6-9, 1989, Post Deadline Paper, pp. PD7-1 through PD7-4.

P. F. Wysocki et al., "Broadband Operation of Erbium-Doped Silica-Based Fiber Lasers", SPIE, vol. 1171, Fiber Laser Sources and Amplifiers, Sep. 6-8, 1989, pp. 261-270.

P. F. Wysocki et al., "Electronically Tunable, 1.55-$\mu$m Erbium-Doped Fiber Laser", Optics Letters, vol. 15, No. 5, Mar. 1, 1990, pp. 273-275.

INTERFEROMETER UTILIZING SUPERFLUORESCENT OPTICAL SOURCE

RELATED APPLICATIONS

This application is a continuation-in-part of U.S. patent application Ser. No. 401,225, filed on Aug. 31, 1989.

BACKGROUND OF THE INVENTION

1. Field of the Invention

The present invention is in the field of optical interferometers and components, and, in particular, is in the field of broadband light sources for interferometers, rotation sensors, and the like.

2. Description of the Related Art

A Sagnac interferometer comprises an optical loop, typically of optical fiber, that is used to sense rotation of an object onto which the loop is mounted. Briefly, such interferometers operate by dividing the optical energy from a light source into two substantially equal beams of light and causing the two beams of light to propagate around the loop in opposite directions. The two beams of light are combined after passing through the loop and the changes in intensity of the combined light caused by interference of the two beams is detected. In accordance with the well-known Sagnac effect, rotation of the object and thus of the loop of fiber causes changes in the relative phase between light propagating in the two directions which in turn causes the detected intensity to change. The rotation rate of the loop can be determined from the detected changes in the intensity. See, for example, U.S. Pat. Nos. 4,410,275; 4,529,312; 4,637,722; 4,671,658; 4,687,330 and 4,836,676.

With respect to Sagnac interferometers, it has been found to be advantageous to use a broadband light source to provide the light introduced into the loop of optical fiber. See, for example, U.S. Pat. No. 4,637,025 wherein a super radiant light source is described. The light source in U.S. Pat. No. 4,637,025 operates by introducing a pump signal into a single-mode optical fiber having a core doped with an active fluorescent material such as neodymium or other rare earths. The pump light has a sufficient intensity to cause amplification of spontaneous emission of photons by the fluorescent material. In one embodiment (FIG. 1), pump light is input into the optical fiber via a lens. In the second of the two embodiments, the pump light is introduced via a dichroic lens that is transparent to the pump light and highly reflective of emitted light. The pump light is absorbed by the fluorescent material and excites the electrons therein to higher energy states resulting in the emission light when the electrons transition to lower states. Because of the random manner in which the spontaneous emissions occur, the amplified emitted light is effectively spontaneous fluorescence and temporally incoherent.

The two embodiments in U.S. Pat. No. 4,637,025 generate light that is emitted in all directions in the core of the fiber. A portion of the light generated in the core propagates directly out the output end of the fiber. A second portion of the light propagates toward the input end of the fiber. In the first embodiment, the light reaches the input end of the fiber. Although the input end does not have a reflector, as in the second embodiment, surfaces in the optical path cause a portion of the generated light to be reflected back into the fiber. In the second embodiment, the dichroic reflector is included to specifically reflect the generated light that propagates toward the input end portion back toward the output end portion.

No reflector is provided at the output end of the fiber in U.S. Pat. No. 4,637,025 so that laser oscillations are purportedly prevented. See, for example, Column 5, lines 1-5, of the patent. Although there is no intent to support laser oscillations in such a light source, it has been found that when such light sources are used in combination with Sagnac interferometers, for example, the optical fiber loop of the interferometer acts like a mirror. That is, the light entering the fiber loop propagates around the loop and exits propagating in the opposite direction to the entry direction (i.e., back towards the light source). A portion of the exiting light re-enters the fluorescent optical fiber. The dichroic reflector (FIG. 2) at the input end of the optical fiber (FIG. 1) reflects this return light. Thus, it can be seen that an unintentional laser oscillation can occur because of the interaction of the reflection at the input end of the fluorescent fiber and the "reflection" caused by the optical fiber loop. The laser oscillations are unacceptable for many applications.

SUMMARY OF THE PRESENT INVENTION

The present invention comprises an interferometer having a light source and an optical loop. The light source comprises an optical waveguide formed of a material which emits a broadband optical signal in response to pumping with pump radiation. The light source introduces the emitted optical signal to the optical loop along a connecting optical path extending between the optical loop and the light source. The loop returns at least a portion of light comprising the emitted optical signal back to the light source along the connecting optical path to provide a returning broadband optical signal. The light source is non-reflective for the returning optical signal, to prevent the returning optical signal from being reflected back to the loop. By preventing such reflection, the interferometer avoids resonance between the source and the loop, and prevents substantial narrowing of the spectral line width.

In a preferred embodiment, the light source additionally comprises a source of pump light coupled to optically pump the light-emitting material such that the pump light propagates in the waveguide in a direction opposite to that of the emitted optical signal. The waveguide comprises an optical fiber having a core surrounded by a cladding, and the pump light source couples the pump light into the cladding. The optical fiber has a first numerical aperture corresponding to a first acceptance region, and the cladding has a second numerical aperture corresponding to a second acceptance region. The acceptance regions define an aperture window therebetween, and the pump source introduces the pump light into the aperture window at one end of the fiber. In one embodiment, the core of the optical fiber is circular and single mode, while the cladding is rectangular and multi-mode. The fiber is doped with neodymium or other light-emitting material.

In accordance with a further aspect of the invention, the returning optical signal propagates through the waveguide and exits the waveguide at an end thereof. A photodetector is positioned at such end to detect the returning optical signal, and is arranged to prevent light incident thereon from being reflected back into the loop. In the preferred embodiment, the optical loop comprises an optical waveguide having two polarization modes, and the emitted optical signal has a coherence time which is significantly less than the propagation time difference between the modes after traversing the length of the loop.

The invention also encompasses a method of operating an interferometer having a light source and an optical sensing loop. In accordance with this method, pump radiation is input to an optical waveguide to pump the optical waveguide to emit broadband light. Emitted light from the light source propagates towards the optical sensing loop, and light from the optical sensing loop is returned towards the light source without returning to the loop to prevent optical resonance of the emitted light in the interferometer. Preferably, the emitted light is emitted from a first end of the waveguide and the pump radiation is coupled to the waveguide in the form of optical energy at a location between the sensing loop and a second end of the waveguide. A further preferred aspect of the method involves passing the emitted light propagating from the loop to the source through the waveguide to provide amplified light and detecting the amplified light.

DETAILED DESCRIPTION OF THE PREFERRED EMBODIMENTS

Figure 1:
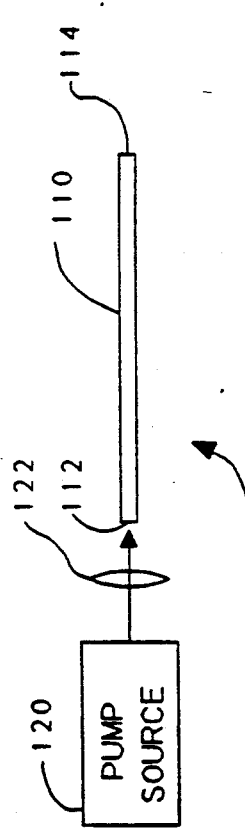
FIG. 1 is a pictorial representation of a conventional broadband light source.

FIG. 1 illustrates an exemplary broadband light source 100. As illustrated, the light source 100 includes a waveguide comprising an optical fiber 110 having a first end 112 and a second end 114. The optical fiber 110 is a fluorescent optical fiber. That is, when the optical fiber 110 is pumped with optical energy within specified ranges of optical wavelengths (referred to as the absorption bands of the optical fiber), the optical fiber 110 generates output light having a wavelength responsive to the wavelength of the pump optical energy. The optical fiber 110 comprises a core of a host glass that is doped with an active fluorescent material such as neodymium which absorbs light having wavelengths on the order of 0.82 microns, for example. The absorbed photons from the pump optical energy excite the electrons in the active material to higher energy electron energy states, and, when the electrons transition to lower energy levels, photons are emitted at characteristic emission bands, or fluorescing wavelengths. For example, in the case of neodymium, the emission bands are 1.06 microns and 1.35 microns. The transitions through the lower energy levels back to the ground state for spontaneous emission occur in a random manner to cause the photon emissions caused by the pump light to be amplified spontaneous fluorescence, thus causing the emitted output light to be temporally incoherent.

The broadband light source 100 further includes a pump light source 120 which may be, for example, a laser diode, or the like, that provides an optical pump signal having a wavelength within one of the absorption bands of the fluorescent optical fiber 110, for example, 0.82 microns. The pump light provided by the pump light source 120 is introduced into the first end 112 of the optical fiber 110 via a lens 122, or the like, so that the pump light propagates in the fluorescent material in the core of the optical fiber 110. The intensity of the pump light provided by the pump light source 120 is selected to be sufficiently great to cause a population inversion of the electrons in the fluorescent material, thereby supporting amplified spontaneous emission of light from the fluorescent material. The length of the fluorescent optical fiber 110 is selected to be sufficiently long so that substantially all the pump optical energy is absorbed by the fluorescent material and little, if any, pump optical energy is emitted from the second end 114 of the optical fiber 110.

The emitted light energy has a high radiant intensity relative to the light produced by a so-called super radiant light-emitting diode (LED). In addition, the emitted light has a wavelength distribution that is broader than the characteristic spectral line output of a laser diode, has a low temporal coherence, and has a principal wavelength that is generally temperature independent.

The emitted light is generated in all directions within the fluorescent material in the core of the fluorescent optical fiber 110. The portion of the light initially propagating in the general direction of the second end 114

(referred to herein as the forward propagating light) will be emitted therefrom as a broadband output signal.

Figure 2:
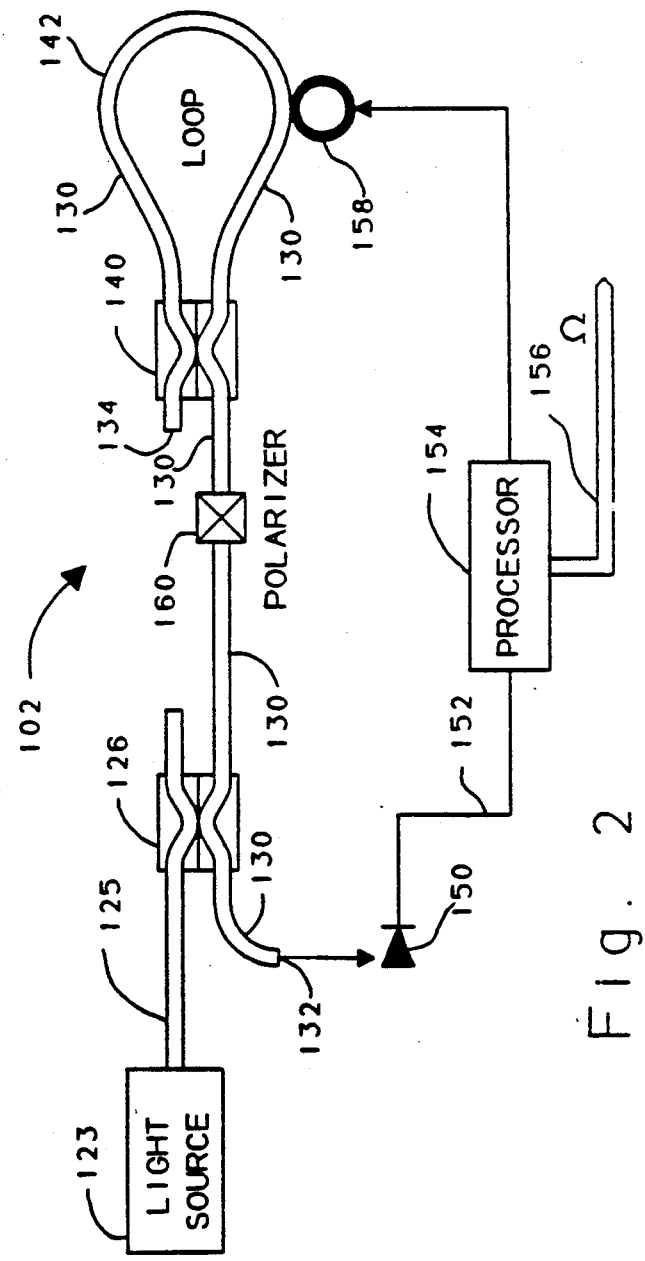
FIG. 2 is a pictorial representation of a conventional Sagnac interferometer.

FIG. 2 illustrates a conventional Sagnac interferometer 102 having a light source 123 (typically a superluminescent diode) coupled to an optical fiber 125. Light from the source 123 is introduced into the Sagnac interferometer 102 by, for example, forming the optical fiber 125 into one-half of a first directional coupler 126, which is preferably constructed in accordance with U.S. Pat. No. 4,536,058, or the like. The second half of the first directional coupler is formed on an optical fiber 130 which has a first end 132 and a second end 134. The first directional coupler 126 is preferably constructed to couple approximately 50 percent of the light from the fluorescent optical fiber 110 to the optical fiber 130 in the Sagnac interferometer 102.

In addition to the coupler 126, the Sagnac interferometer 102 further comprises a second directional coupler 140 that forms a portion of the optical fiber 130 into a loop 142 between the two ends 132 and 134. The loop 142 operates as the sensing portion of the interferometer 102. The second directional coupler 140 is preferably constructed in the same manner as the first directional coupler 126 and is also preferably a 50 percent coupler such that approximately 50 percent of the light coupled to the optical fiber 130 from the light source 123 propagates around the loop 142 in a first direction (clockwise in FIG. 2) and approximately 50 percent propagates around the loop 142 in a second opposite direction (counterclockwise in FIG. 2). The light propagating around the loop 142 is recombined by the second directional coupler 140, and the recombined light signal propagates back toward the first directional coupler 126. Approximately 50 percent of the light is provided as an output signal via the first end 132 of the optical fiber 130 with the other 50 percent being coupled back to the light source 123.

The output signal from the first end 132 is detected by a detector 150 which provides an electrical output signal on a line 152 that is provided to a processor 154. The processor 154 processes the electrical output signal and provides a calculated output signal Ω on a bus 156 responsive to the direction and rate at which the loop 142 is rotated. The operation of Sagnac interferometers is well-known and will not be discussed in detail herein. One skilled in the art will recognize that additional components are frequently used to improve the operation of such interferometers. For example, the Sagnac interferometer 102 of FIG. 2 further includes a phase modulator 158 driven by the processor 154 that introduces a phase modulation into the counterpropagating light signals within the loop 142 to enable the electrical output signal to be synchronously demodulated. An example of a Sagnac interferometer of this type is disclosed in U.S. Pat. Nos. 4,671,658 and 4,881,817. Other components, such as a polarizer 160 positioned on the optical fiber 130 between the first directional coupler 126 and the second directional coupler 140, are also advantageously used in many applications. One skilled in the art will also recognize that portions of the Sagnac interferometer 102 can be advantageously constructed using integrated optic components or bulk optic components.

The broadband light source 110 of FIG. 1 may be substituted for the light source 123 of the interferometer 102 to supply broadband light thereto. This may be accomplished either by coupling the second end 114 of the fiber 110 to the input end of the fiber 125 or by forming the fiber 110 into one-half of the first directional coupler 126. The light generated in the fluorescent optical fiber 110 that propagates toward the first end 112 (referred to herein as the backward propagating light) will be generally emitted from the first end 112 toward the pump source 120. However, since the first end 112 will generally be either a smooth flat end or a smooth spherical end (as described in U.S. Pat. No. 4,637,025), the first end 112 will act as a partial reflector of the backward propagating light and will cause the backward propagating light to be reflected back toward the second end 114 of the optical fiber 110. Further, the lens and pump source have surfaces which reflect light. The reflected light will also be introduced into Sagnac interferometer 102. In U.S. Pat. No. 4,637,025, it was considered desirable to reflect the backward propagating light. For example, in FIG. 2 of that patent, an embodiment is disclosed in which a dichroic reflector is formed on the first end 112 so that substantially all the backward propagating emitted light is reflected toward the second end 114.

Applicants have discovered that the reflection of the backward propagating light is undesirable in many applications. In particular, the loop 142 provides the same effect as a mirror, and up to 50 percent of the light introduced into the Sagnac interferometer 102 and propagating around the loop 142 can be coupled back to the light source. If the light source of FIG. 1 is used in the interferometer of FIG. 2, the source will reflect a portion of this light so that it again propagates back towards the interferometer loop. It can be seen that the source of FIG. 1 and the loop of FIG. 2 act as the two mirrors of a resonant cavity. Thus, resonant lasing can occur to cause the generation of undesirable temporally coherent laser light.

Figure 3:
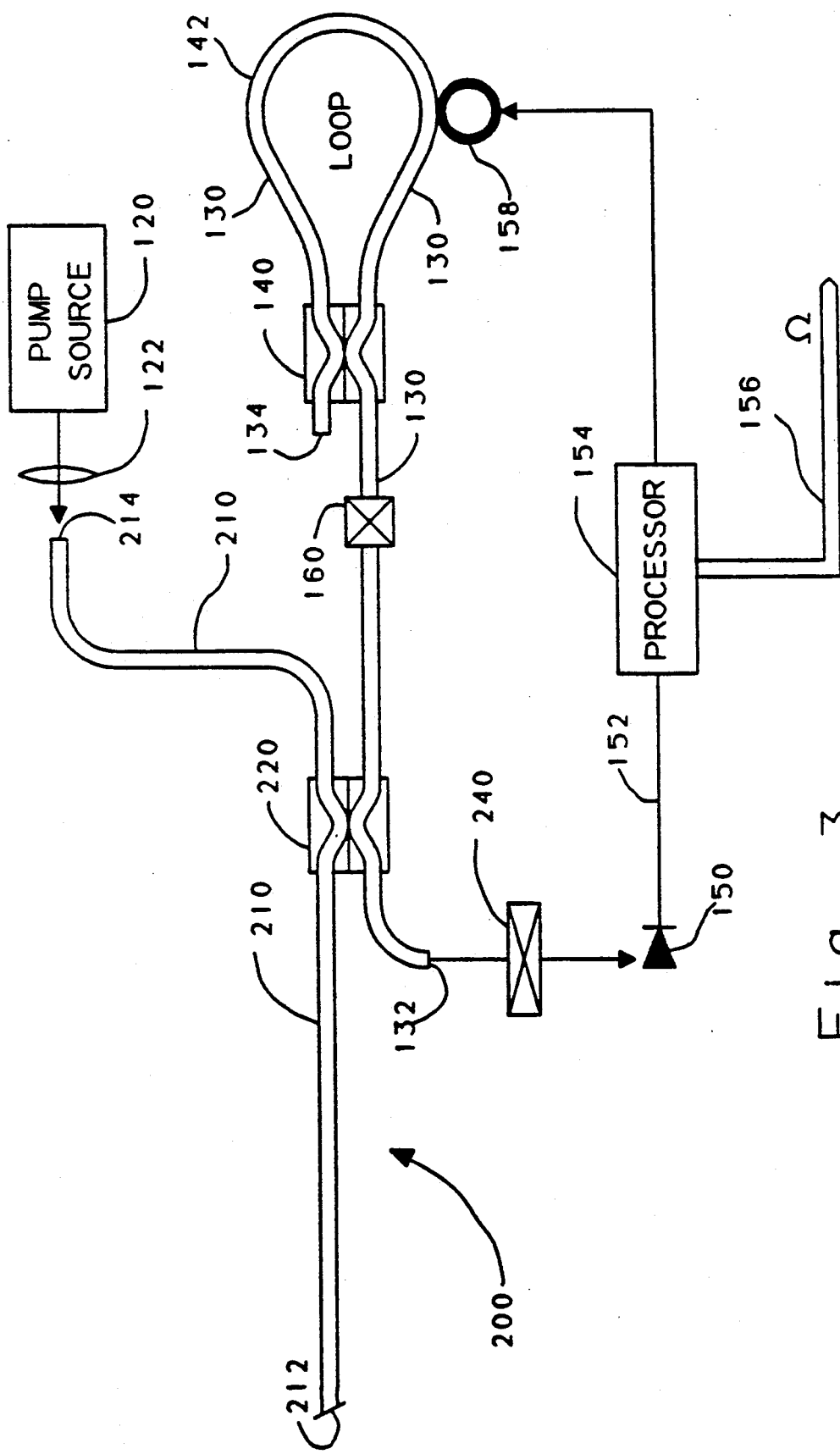
FIG. 3 is a pictorial representation of a conventional Sagnac interferometer and a broadband light source in accordance with one aspect of the present invention.

FIG. 3 illustrates a first embodiment of a broadband light source which prevents the resonant lasing from occurring by eliminating the reflection of light at one end of a fluorescent optical fiber. This embodiment uses the same basic configuration as the Sagnac interferometer of FIG. 2, and includes the optical fiber 130 having its first end 132 and its second end 134. The basic operation of the Sagnac interferometer of FIG. 3 is substantially as described above.

As shown in FIG. 3, a light source 200 comprises a fluorescent optical fiber 210 which advantageously has a neodymium-doped core such as described above, or other rare earth-doped core such as erbium. The fluorescent optical fiber has a first end 212 and a second end 214. The light source 200 further includes the pump source 120 which is coupled to the second end 214 of the fluorescent optical fiber using the lens 122, for example. Thus, the pump light introduced into the fluorescent optical fiber 210 propagates from the second end 214 back towards the first end 212. The Sagnac interferometer is coupled to the light source 200 via a coupler 220 which is formed onto the fluorescent optical fiber 210 proximate to its second end 214 and is formed onto the optical fiber 130 proximate to its first end 132. Unlike the coupler 126 of FIG. 2, the coupler 220 of FIG. 3 is a multiplexing coupler. As described, for example, in U.S. Pat. No. 4,556,279, the multiplexing coupler 220 is constructed so that it couples different percentages of light between the two coupler halves in accordance with the wavelength of the light. For example, the multiplexing coupler 220 is constructed so that substantially all the light introduced into the optical fiber 230 at the wavelength of the pump signal (e.g., 0.82 microns) is not coupled and remains in the fluorescent optical fiber 210 to cause the fluorescent effect described above. On the other hand, the multiplexing coupler 220 causes approximately 50 percent of the fluorescent light generated within the fluorescent optical fiber 210 and propagating in the forward direction toward the second end 214 to be coupled from the fluorescent optical fiber 210 to the optical fiber 130. The coupled light propagates in the optical fiber 130 to the directional coupler 140 and thus to the loop 142 of the Sagnac interferometer. In the preferred embodiment, the loop 142 comprises a waveguide (such as an optical fiber) having two polarization modes which propagate light at different velocities, such that the light traversing the loop in one mode yields a propagation time difference with respect to light traversing the loop in the other mode. Preferably, the propagation time difference is significantly greater than the coherence time of the light input to the loop.

The first end 212 of the fluorescent optical fiber 210 is specifically formed to preclude reflections at the first end 212. For example, in FIG. 3, a slashed line across the first end 212 indicates that the first end 212 has been cut at an angle (e.g., 15 degrees) so that light propagating to the first end will be non-reflectively emitted from the first end 212. Thus, substantially no light propagating toward the first end 212 will be reflected back toward the second end 214.

The detector 150 is positioned proximate to the first end 132 of the optical fiber 130 to detect light emitted therefrom. A filter 240 is advantageously positioned between the first end 132 and the detector 240. The purpose for the filter 240 will be briefly discussed below.

The pump light coupled to the fluorescent optical fiber 210 stimulates the emission of broadband light as discussed above in connection with FIG. 1. The intensity of the pump light is selected to be sufficiently great to cause a population inversion of the electrons in the fluorescent material, thereby supporting amplified spontaneous emission of light from the fluorescent material. The length of the fluorescent optical fiber 210 is selected to be sufficiently long so that substantially all the pump optical energy is absorbed by the fluorescent material and little, if any, pump optical energy is emitted from the first end 212 of the optical fiber 210; however, it should be understood that since the first end 212 is non-reflectively terminated, this is not a stringent requirement.

The re-combined light returning from the Sagnac interferometer returns to the multiplexing coupler 220 where 50 percent of the re-combined light is coupled to the fluorescent optical fiber 210 and propagates to the first end 212 and is non-reflectively emitted therefrom. The other 50 percent of the re-combined light remains in the optical fiber 130 and propagates to the first end 132 where it is emitted. The emitted light passes through the filter 240 to the detector 150 where it is detected to generate a responsive electrical signal that is processed as discussed above. Although the multiplexing coupler 220 is preferably constructed so that substantially none of the light from the pump source 120 is coupled to the optical fiber 130, the filter 240 is included to filter out any pump light that may be coupled. The filter 240 is selected to have optical characteristics such that substantially all the light at the pump light wavelength (e.g., 0.82 microns) is blocked and such that substantially all the light in the emission band (e.g., 1.06 microns) is transmitted through the filter 240 to the detector 150.

It can be seen that by non-reflectively terminating the first end 212 of the fluorescent optical fiber 210, there is no possibility of creating a resonant cavity to support laser oscillations. This is particularly advantageous in maintaining the broadband, temporally incoherent characteristics of the light introduced into the Sagnac interferometer from the broadband light source 200, and in preventing spectral narrowing of the light propagating in the interferometer.

In the embodiment of FIG. 3, a portion of the light emitted by the pump source 120 may undesirably couple through the multiplexing coupler 220 to the optical fiber 130. There is a possibility that the pump light could interfere with the operation of the detector 150.

Figure 4:
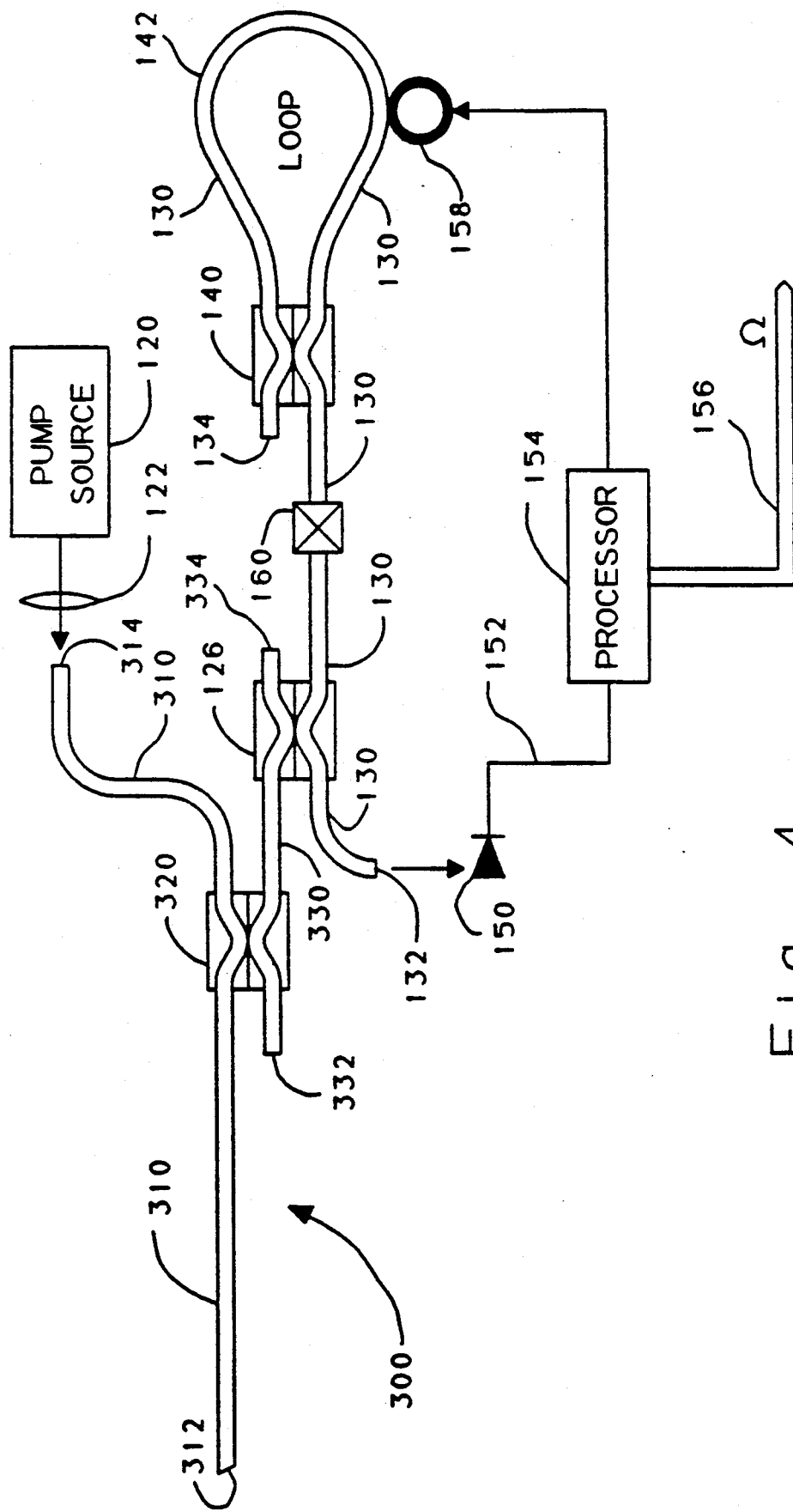
FIG. 4 is a pictorial representation of a conventional Sagnac interferometer and a broadband light source in accordance with a second aspect of the present invention.

FIG. 4 illustrates an alternative embodiment of the present invention in which the detector 150 is effectively isolated from the pump light. As in FIG. 3, the Sagnac interferometer is coupled to a broadband light source 300. The broadband light source 300 includes a fluorescent optical fiber 310 having a first end 312 and a second end 314. The fluorescent optical fiber 310 has the characteristics discussed above. A first multiplexing coupler 320 is formed on the fluorescent optical fiber 310 to couple the fluorescent optical fiber to an optical fiber 330. The optical fiber 330 has a first end 332 and a second end 334. The pump light source 120 is positioned to input light to the second end 314 of the fluorescent optical fiber 310 via the lens 122, as discussed above. The multiplexing coupler 320 is constructed so that substantially none of the pump light is coupled from the fluorescent optical fiber 310 to the optical fiber 330. Thus, substantially all the pump light propagates toward the first end 312 and is absorbed by the fluorescent material in the fluorescent optical fiber 310. The first end of the fluorescent optical fiber 310 is non-reflectively terminated (e.g., by cutting it at an angle of, for example, 15 degrees) so that substantially all the pump light and substantially all of the emitted light propagating toward the first end 312 are discharged therefrom. The multiplexing coupler 320 is further constructed to provide substantially 100 percent coupling at the emission wavelength (e.g., 1.06 microns) of the fluorescent optical fiber 310 so that the emitted light propagating toward the second end 314 is coupled from the fluorescent optical fiber 310 to the optical fiber 330. Thus, substantially none of the light in the emission band will propagate to the pump source 120.

The first half of the first directional coupler 126 is formed on the optical fiber 330. The second half of the first directional coupler is formed on the optical fiber 130. The first directional coupler 126 is constructed to couple approximately 50 percent of the light in the optical fiber 330 to the optical fiber 130 in the Sagnac interferometer. The 50-percent portion of the light coupled to the optical fiber 130 propagates to the second directional coupler 140 and is thus coupled to the loop 142 of the Sagnac interferometer.

The re-combined light from the coupler 140 of the Sagnac interferometer propagates back to the first directional coupler 126. Approximately 50 percent of the light remains in the optical fiber 130 and is emitted from the first end 132 to the detector 150. The other 50 percent of the re-combined light is coupled to the optical fiber 330 and propagates back to the multiplexing coupler 320 where it is coupled to the fluorescent optical fiber 310 to propagate to the non-reflective first end 312 and be discharged therefrom. Again, the first end 312 is non-reflectively terminated to prevent the formation of a resonant cavity.

As illustrated, the detector 150 is positioned proximate to the first end 132 of the optical fiber 130. It can be seen that there is substantially no probability of any of the pump light reaching the detector 150 with the pump source 120 positioned as shown. Thus, there is no need for a filter between the first end 132 and the detector 150.

Figure 5:
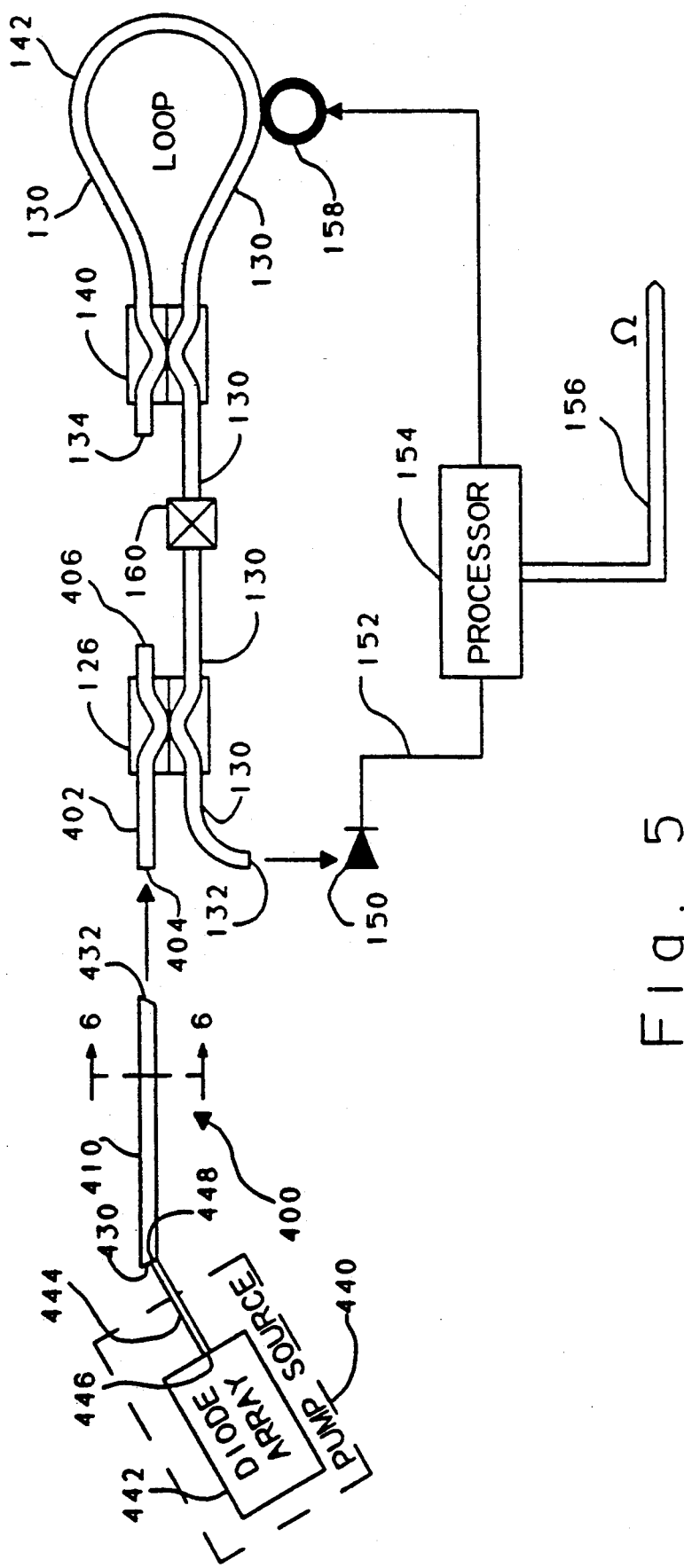
FIG. 5 is a pictorial representation of a conventional Sagnac interferometer and a broadband light source in accordance with an additional aspect of the present invention in which the broadband light source comprises a double-clad neodymium-doped optical fiber.

FIG. 5 illustrates a further embodiment of the present invention. The interferometer is constructed substantially as described above. The interferometer is connected to a broadband light source 400 via the first directional coupler 126. The directional coupler 126 couples the optical fiber 130 to an optical fiber 402 that has a first end 404 and a second end 406.

Figure 6:
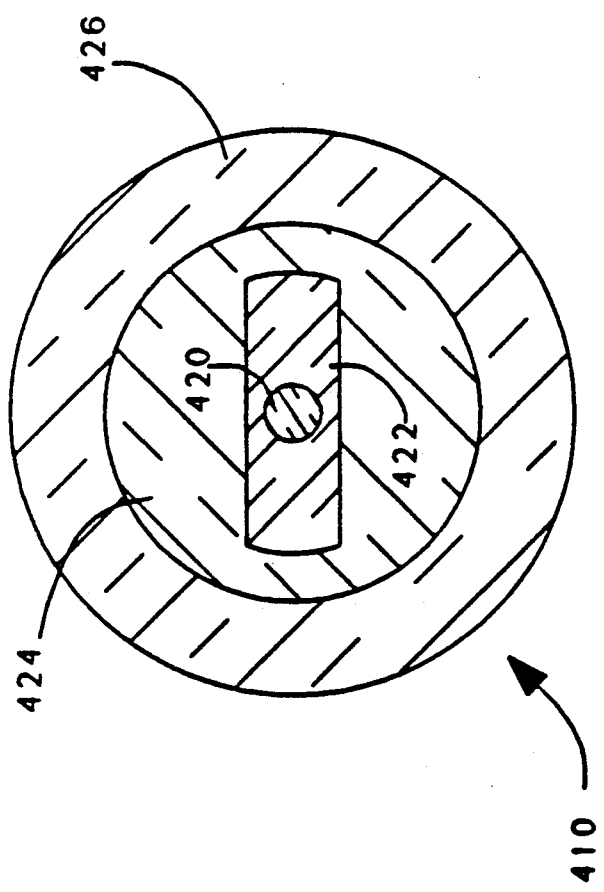
FIG. 6 is a cross-sectional view of the double-clad neodymium-doped optical fiber taken along the lines 6—6 in FIG. 5.

The broadband light source 400 is constructed using a double-clad fluorescent optical fiber 410 such as is available from Polaroid Corporation. The double-clad optical fiber 400 is shown in more detail in a cross sectional view in FIG. 6. As illustrated, the double-clad optical fiber 410 includes an inner core 420 comprising silica glass doped with approximately 0.5 percent by weight of $Nd_2O_3$ and 3.8 percent by weight of $Al_2O_3$. The core 420 has a numerical aperture of 0.16. The core 420 has a diameter of approximately 4.8 microns and is surrounded by a first cladding 422 having an approximately rectangular shape (e.g., having two substantially parallel sides connected by slightly rounded ends, as shown). The first cladding 422 has approximate rectangular dimensions of 110 microns by 45 microns to provide a ratio of first cladding area to core area of approximately 274. The first cladding 422 comprises mainly silica ($SiO_2$). The first cladding 422 is surrounded by a second cladding 424 which is a first buffer coating. The second cladding 424 comprises a soft fluro-polymer with a refractive index of approximately 1.39. The numerical aperture between the first cladding 422 and the second cladding 424 is approximately 0.4. The second cladding 424 is surrounded by a second or outer buffer coating 426 which comprises a commercial hard polymer for protecting the double-clad optical fiber 410.

The first cladding 422 functions as a multimode core of the double-clad optical fiber 410. As will be discussed below, the multimode core (i.e., the first cladding 422) will accept light that is introduced at such an angle that it will not be accepted by the inner core 420 of the double-clad optical fiber 410. Similarly, light can be introduced into the first cladding 422 at a position such that it does not enter the inner core 420.

Returning to FIG. 5, the double-clad optical fiber 410 has a first end 430 and a second end 432, each of which is non-reflectively terminated by cutting the two ends at angles (e.g., the first end 430 and the second end 432 are cut at approximately 15 degrees). The second end 432 is positioned proximate to the first end 404 of the optical fiber 402 in the interferometer. A lens (not shown) can advantageously be used to direct light from the second end 432 of the double-clad optical fiber 410 into the first end 404 of the optical fiber 402. Thus, approximately 50 percent of the light generated by the broadband light source 400 is coupled to the Sagnac interferometer.

The first end 430 of the double-clad optical fiber 410 is positioned to receive pump light from a pump source 440. In the embodiment of FIG. 5, the pump source 440 comprises a diode array 442, such as a GaAlAs phased array, and a multimode fiber 444. The multimode fiber 444 has a first end 446 and a second 448. The diode array 442 introduces light into the first end 446 and it propagates to the second end 448. The second end 448 of the multimode fiber 444 is pigtailed to the double-clad optical fiber 410 so that the light is coupled into the double-clad optical fiber 410. This is illustrated more clearly in FIG. 7 which is a cross-sectional view of the pigtail splice between the two fibers 410, 444.

Figure 7:
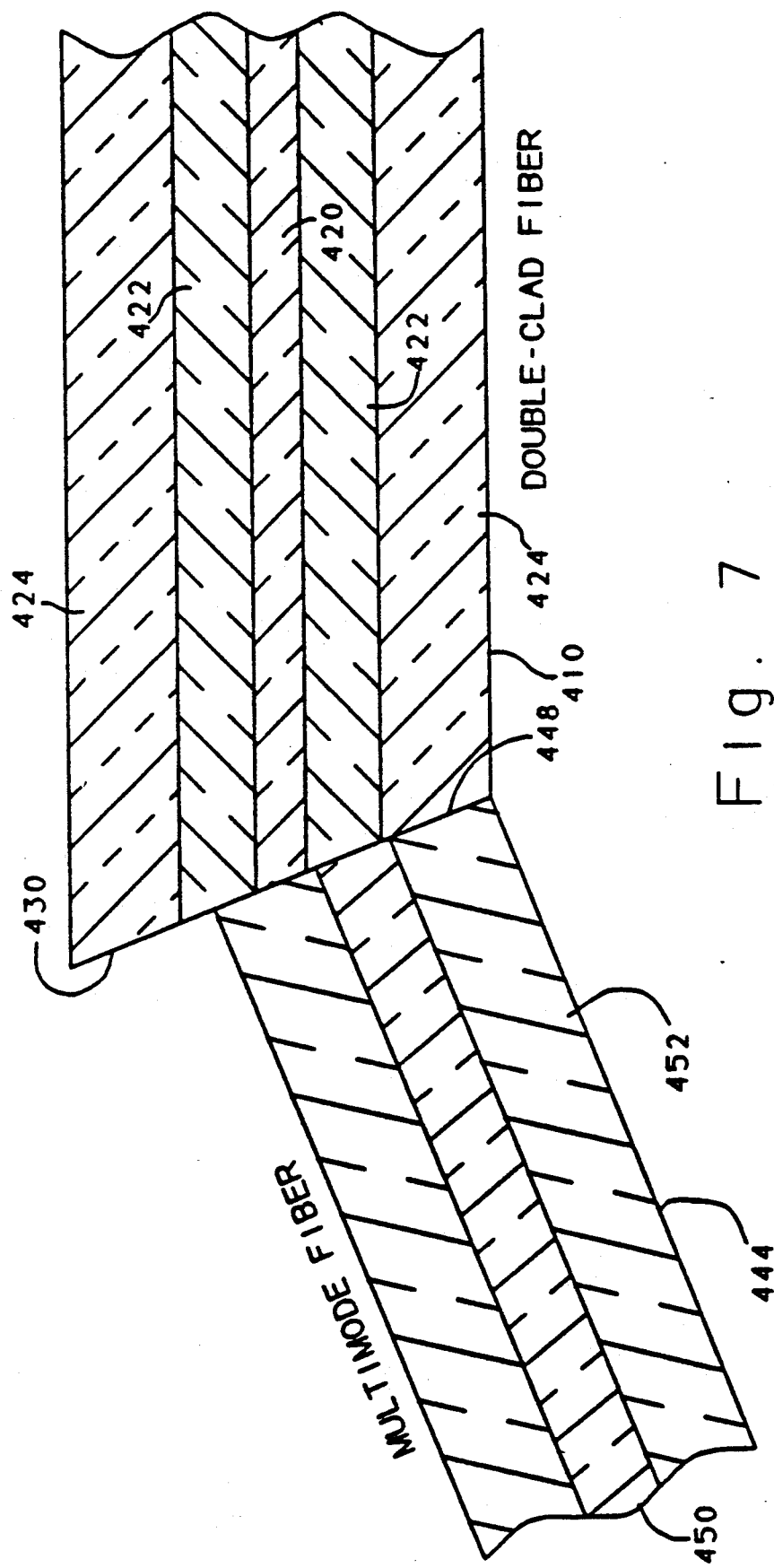
FIG. 7 is cross-sectional representation of the juxtaposition of the double-clad neodymium-doped optical fiber with the multimode optical fiber of FIG. 5.

As illustrated in FIG. 7, the multimode fiber 444 has a core 450 and an outer cladding 452. The multimode fiber 444 is positioned on the angled cut first end 430 of the double-clad optical fiber 410 such that the core 450 is juxtaposed with the first cladding 422 of the double-clad optical fiber 410. Thus, the light discharged from the multimode fiber 444 enters into the first cladding 422 of the double-clad optical fiber 410 and begins propagating therein. Since the light enters the double-clad optical fiber 410 at an angle, the light is not guided by the core 420 of the double-clad optical fiber 410, but rather repeatedly traverses the core 420. As the light traverses the core 420, it is absorbed by the neodymium doping to cause the excitation of the electrons therein, as discussed above. This results in superfluorescing and the emission of broadband light into the core 420. The emitted broadband light propagates to the second end 432 of the double-clad optical fiber 410 where it is coupled to the Sagnac interferometer. The angled cut of the second end 432 prevents reflection of any of the emitted light back toward the first end 430. Similarly, the angled cut of the first end 430 prevents any of the backward propagating light from being reflected toward the second end 432. Thus, there is substantially no likelihood of creating a resonant cavity that would support laser oscillations, and the broadband characteristics of the superfluorescent output signal are thereby preserved.

In FIGS. 5 and 7, the pump light from the multimode fiber 444 is introduced into the double-clad optical fiber 410 at an angle such that the light is introduced into an aperture window between the numerical aperture of the core and the numerical aperture of the cladding. That is, the angle of the multimode fiber 444 with respect to the double-clad optical fiber 410 is sufficiently greater than the acceptance angle of the core 420 that the light is not guided in the core 420. On the other hand, the angle of the multimode fiber 444 with respect to the double-clad optical fiber 410 is sufficiently less than the acceptance angle of the first cladding 422 so that the light is guided within the first cladding 422 and traverses the core 420, as discussed above. In other words, the light is introduced into the double-clad optical fiber 410 outside the numerical aperture of the core 420 and within the numerical aperture of the first cladding 422. In the exemplary double-clad optical fiber 410 having a core numerical aperture of approximately 0.16 and a first cladding numerical aperture of approximately 0.40, the aperture window or acceptance window corresponds to a range of angles greater than approximately 8 degrees and less than approximately 23 degrees. For example, in one particular embodiment of the invention, light is introduced at an angle of 15 degrees to be well within the acceptance window for the first cladding 422.

In FIG. 7, the core 450 of the multimode optical fiber 444 is offset from the inner core 420 of the double-clad optical fiber 410 so that the light enters only the multimode core (i.e., the first cladding 422) of the double-clad optical fiber 410. In addition, the two fibers are positioned so that the longitudinal axes of the two fibers are at an angle of approximately 15 degrees, for example, so that the light is only within the acceptance window of the multimode core (i.e., the first cladding 422) of the double-clad optical fiber 410. Thus, the pump light from the multimode fiber 444 is not accepted by the inner core 420. These two methods of precluding light from entering the inner core 420 (i.e., positioning the two fibers at an angle and offsetting the two inner cores) can be used together as shown or separately. The offset of the two inner cores has the further advantage that the fluorescent light generated within the inner core 420 of the double-clad optical fiber 410 does not couple to the inner core 450 of the multimode optical fiber 444. This precludes any light from being reflected at the first end 448 of the multimode optical fiber 444 and re-entering the double-clad optical fiber 410.

Figure 8:
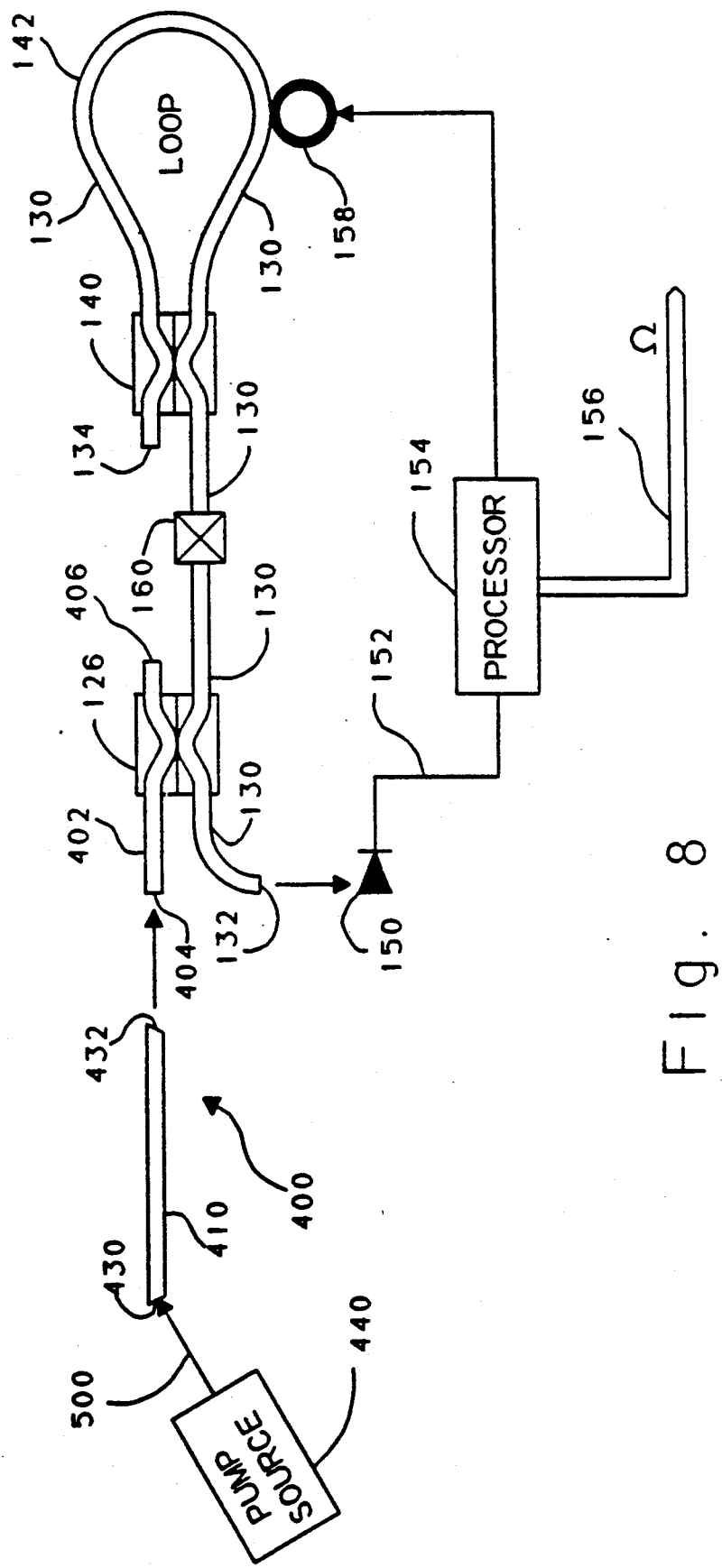
FIG. 8 is a pictorial representation of a conventional Sagnac interferometer and the broadband light source in accordance with the present invention, illustrating an alternative placement of the pump source with respect to the double-clad neodymium doped optical fiber.

FIG. 8 illustrates an alternative embodiment in which the pump source 440 is positioned proximate to the first end 430 of the double-clad optical fiber 410. However, the pump source 440 is not pigtailed to the first end 430. Rather, the light is directed toward the first end 430 as a beam 500. The beam can be focused onto the first end 430 with a lens (not shown). Again, the pump source 440 is positioned at an angle with respect to the double-clad optical fiber 410 so that the beam is within an aperture window defined between the numerical apertures of the core 420 and the first cladding 422.

Figure 9:
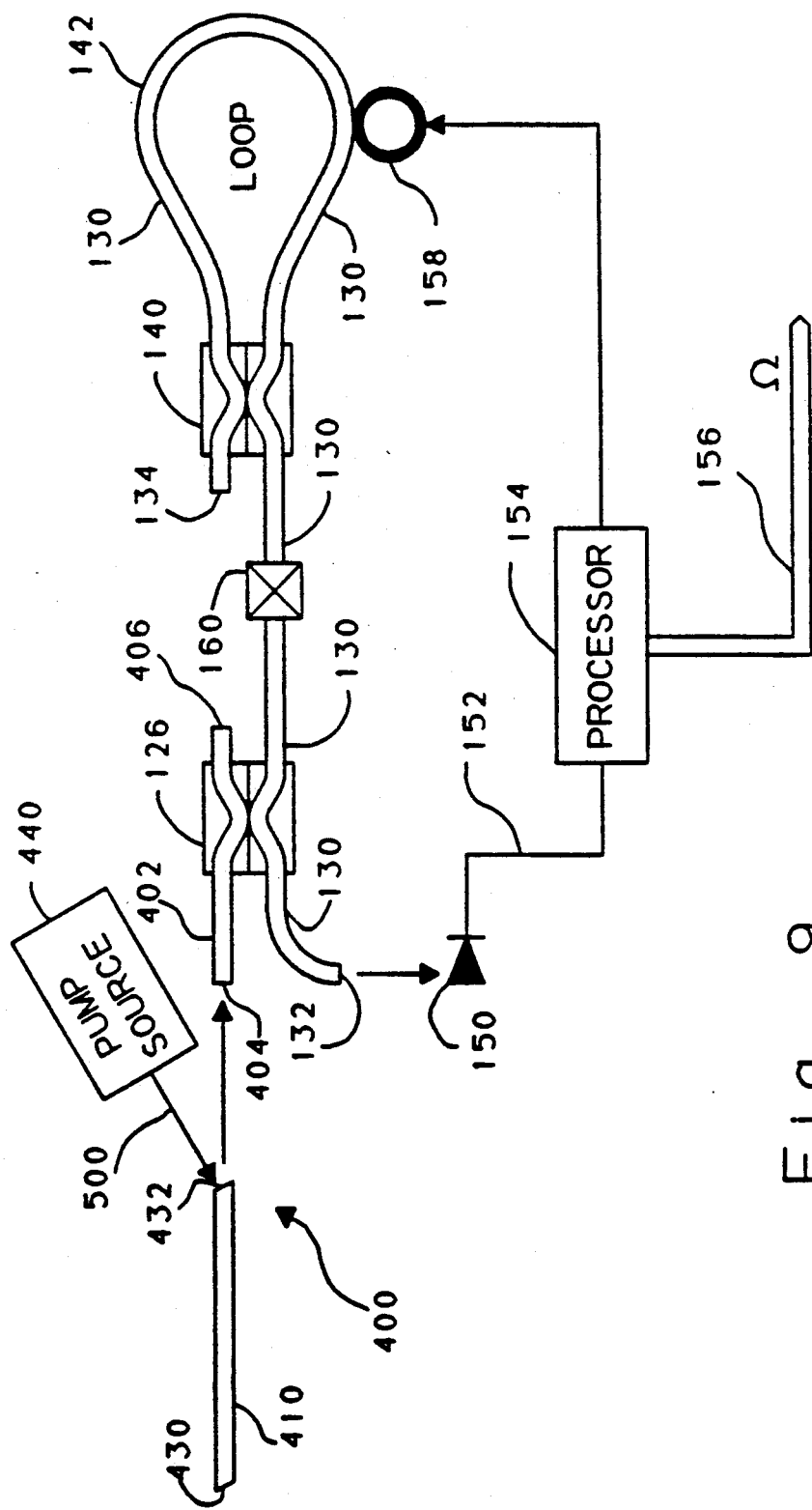
FIG. 9 is a pictorial representation of a conventional Sagnac interferometer and the broadband light source in accordance with the present invention, illustrating a further alternative placement of the pump source with respect to the double-clad neodymium doped optical fiber.

FIG. 9 illustrates a still further embodiment of the present invention wherein the pump source 440 is positioned at an angle with respect to the second end 432 of the double-clad optical fiber 410. Since the pump source 440 is at an angle it can be positioned away from the centerline of the double-clad optical fiber 410 so as not to interfere with the light emitted from the second end 432 while remaining with the acceptance window of the first cladding 422. In this embodiment, the pump light propagates away from the Sagnac interferometer so that there is substantially no possibility of the pump light entering the interferometer and interfering with its operation. Further, the light returning from the Sagnac interferometer propagates from the second end 432 toward the first end 430 of the double-clad optical fiber 410 where it is non-reflectively discharged. Thus, there is substantially no probability of the light from the interferometer entering the pump source 440.

Figure 10:
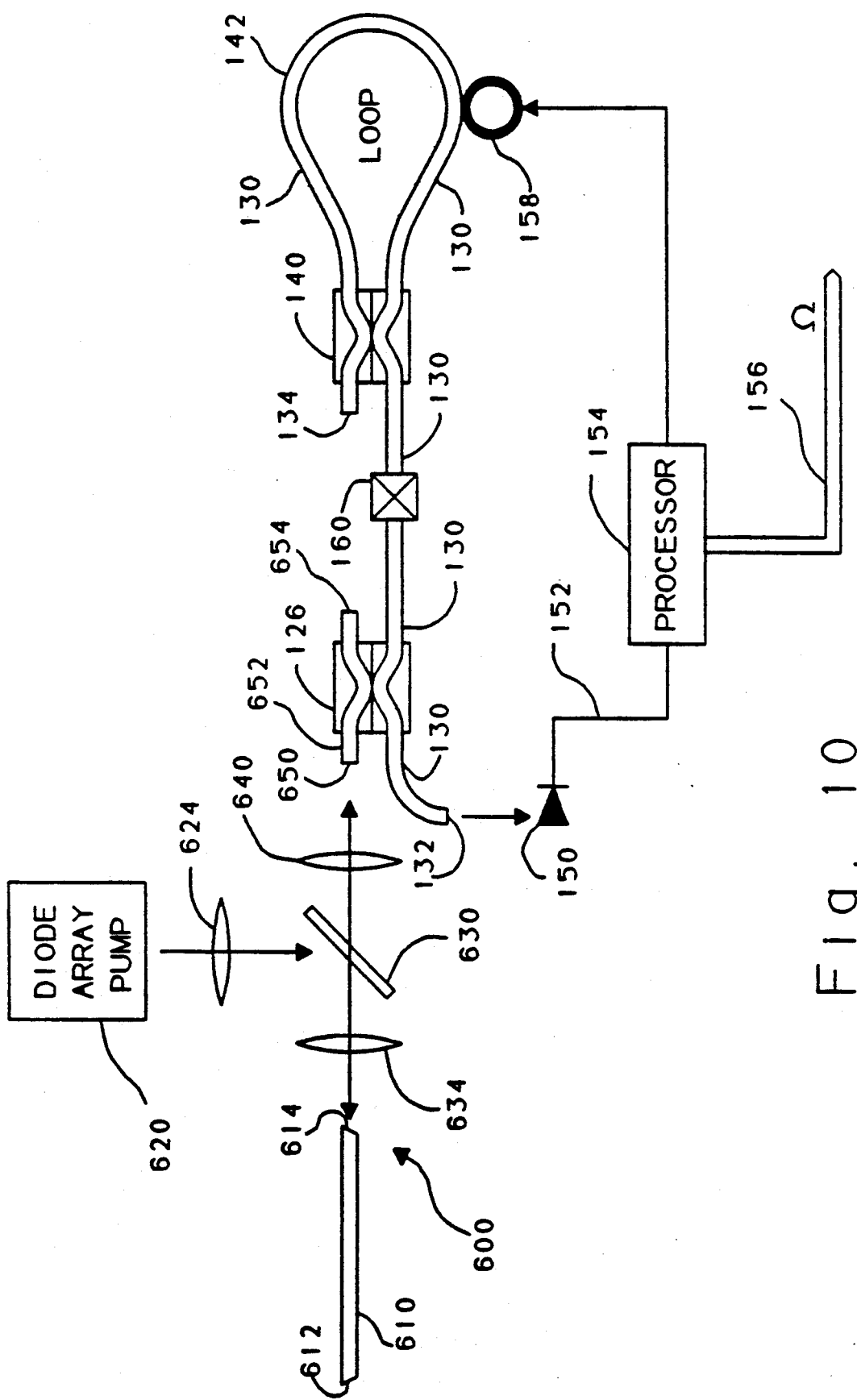
FIG. 10 is a pictorial representation of a conventional Sagnac interferometer in combination with a further embodiment of a broadband light source in accordance with the present invention, wherein the pump light is coupled to a doped optical fiber via a dichroic mirror.

FIG. 10 illustrates a further embodiment of the present invention in which a broadband light source 600 comprises a double-clad fluorescent optical fiber 610 having a first end 612 and a second end 614. The double-clad fiber 610 is advantageously the same as the fiber 400 described above available from Polaroid Corporation. Optical pump light is provided by a diode array pump 620 which is advantageously a 500 milliwatt Spectra Diode Labs 815-nanometer laser diode array. In the preferred embodiment, the diode array pump 620 is operated at approximately 350 milliwatts with a current of 650 Ma and provides an optical output signal having a 3 Db bandwidth of 2.75 nanometers. The output of the diode array pump 620 is collimated by a first microscope objective lens 624 and directed onto a narrowband dichroic mirror 630. The dichroic mirror 630 is selected to reflect substantially all light having a wavelength of 815 nanometers, the wavelength of the pump light provided by the diode array pump 620. The dichroic mirror 630 is further selected to be substantially transparent to light having a wavelength of 1060 nanometers.

The dichroic mirror is preferably oriented at an angle of 45° with respect to the direction of propagation of the pump light so that the pump light is reflected at an angle of 90° toward a second microscope objective lens 634. The second microscope objective lens 634 focuses the pump light into the multimode core of the double-clad fiber 610. The overall coupling efficiency from the diode array pump 620 to the multimode core of the fiber 610 is approximately 50%.

As discussed above, the pump light propagating in the fiber 610 causes fluorescence which generates an optical output signal having a wavelength of 1060 nanometers. The first end 612 of the fiber 610 is cut at an angle so that the portion of the signal propagating toward the first end 612 is non-reflectively coupled from the fiber 610. The portion of the optical signal propagating toward the second end 614 is coupled from the fiber 610 and passes through the second microscope objective lens 634 to the dichroic mirror 630. Since the dichroic mirror 630 is transparent at 1060 nanometers, the 1060-nanometer optical signal passes through the dichroic mirror to a third microscope objective lens 640. The third microscope objective lens focuses the optical signal onto a first end 650 of an optical fiber 652 which has a second end 654. The optical fiber 652 is formed into one-half of the directional coupler 126 discussed above. The directional coupler 126 couples the light to the optical fiber 130 so that it propagates in the rotation sensor loop 142, as discussed above. The light returning from the interferometer loop 142 propagates to the first end 132 of the optical fiber 130 where it is emitted onto the photodetector 150. The operation of the photodetector 150 and the processor 154 in detecting and processing the optical output signal has been discussed above.

Figure 11:
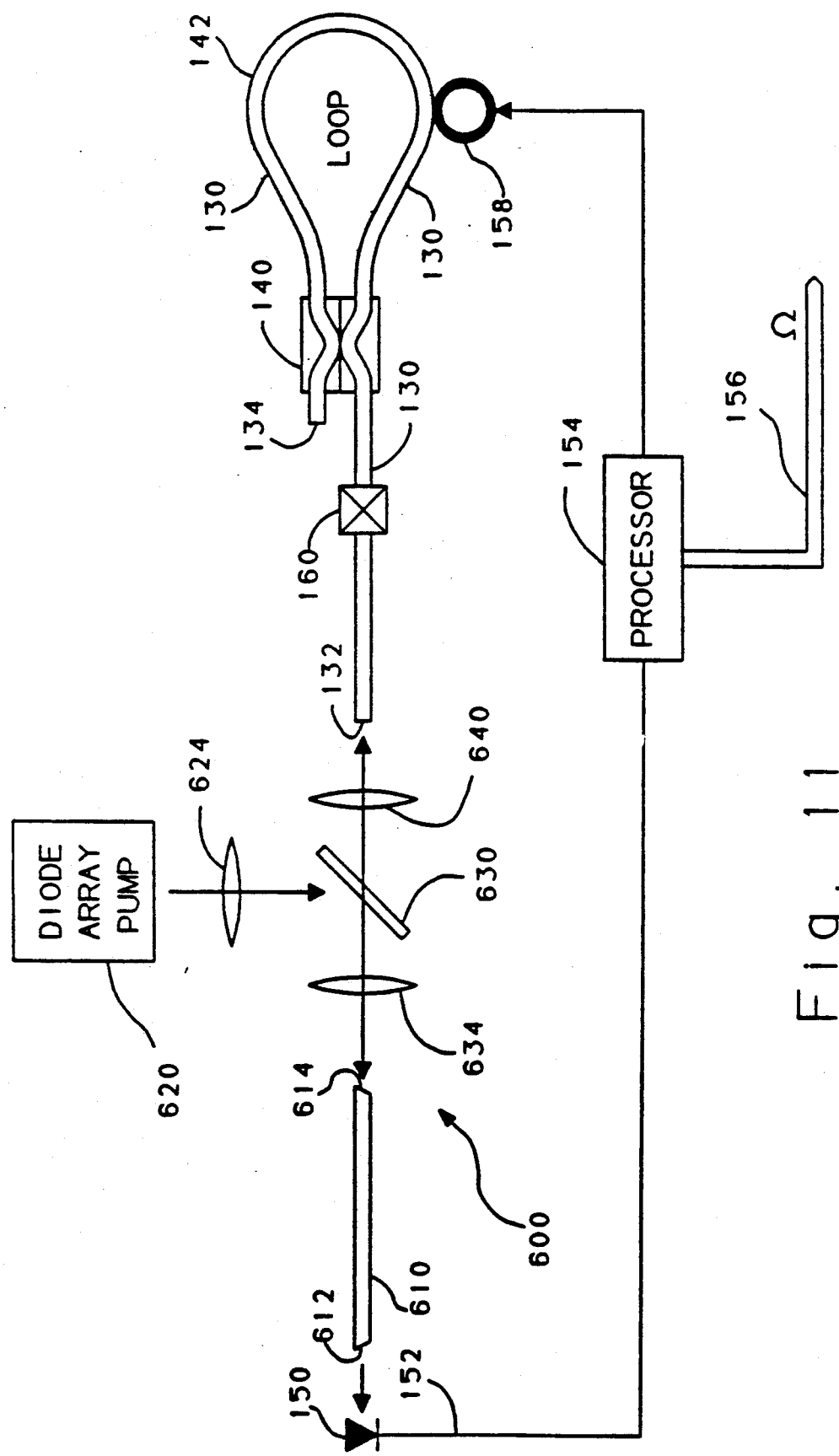
FIG. 11 is a pictorial representation of the Sagnac interferometer and the broadband light source of FIG. 10, wherein the photodetector is positioned to receive amplified light from the doped optical fiber.

FIG. 11 illustrates a further embodiment of the invention derived from the embodiment of FIG. 10 wherein the coupler 126 is eliminated and the interferometer output signal is coupled directly from the optical fiber 130 to the broadband light source 600. The output signal from the interferometer passes through the third microscope objective lens 640, through the dichroic mirror 630, through the second microscope objective lens 634 to the second end 614 of the double-clad fiber 610. The photodetector 150 is positioned proximate to the first end 612 of the double-clad optical fiber 610 and receives the light after it has propagated through the optical fiber 610. However, since the double-clad optical fiber 610 is pumped by the pump light from the diode array pump 620, the optical output signal from the interferometer is amplified within the double-clad optical fiber 610. Thus, the light incident on the photodetector 150 in the embodiment of FIG. 11 has a greater power than the light incident on the photodetector 150 in the embodiment of FIG. 10.

As discussed in more detail in co-pending application Ser. No. 565,255, filed on the same date as the present application, to prevent gain modulation in fluorescent fibers, the frequency of the phase modulation in the interferometer loop should be above a threshold frequency. For an erbium-doped fiber, the gain modulation is quite high for modulator frequencies up to about 500 Hz to 1 KHz, and then decreases rapidly. The fluorescence lifetime of neodymium is on the order of 40 $\mu$sec, less than the lifetime of erbium, which is about 10–15 ms. Thus, the threshold frequency for erbium doped fibers is less than for neodymium doped fibers. In Sagnac interferometers, the modulation frequency is linked to the length of the interferometer loop (see, for example, U.S. Pat. Nos. 4,410,275 and 4,671,658). For fiber loops 1 km in length, the modulation frequency is about 200 KHz. At such frequency, the gain modulation is almost zero for erbium doped fibers and negligible for neodymium doped fibers.

Preferably, in the embodiment of FIG. 11, the photodetector 150 is oriented in the optical path so that the light receiving surface on the photodetector 150 is at an angle with the optical path of light exiting the fluorescent fiber. Thus, any light reflected by this surface of the photodetector 150 will not re-enter the first end 612 of the optical fiber 610. If such light were to re-enter the optical fiber 610, it could create a resonant cavity between the photodetector 150 and the loop 142, an effect which the embodiments of the present invention otherwise avoid. The angle at which the photodetector 150 is oriented is selected so that any reflected light will be outside the numerical aperture of the optical fiber 610. For example, for an optical fiber 610 having a numerical aperture of about 1.1 to 1.2, the angle at which the reflective surface is oriented should be in the range of at least 6 to 7 degrees. In preferred embodiments, an angle of 10 degrees is utilized to further decrease the likelihood of any reflected light entering the optical fiber 610.

Figure 12:
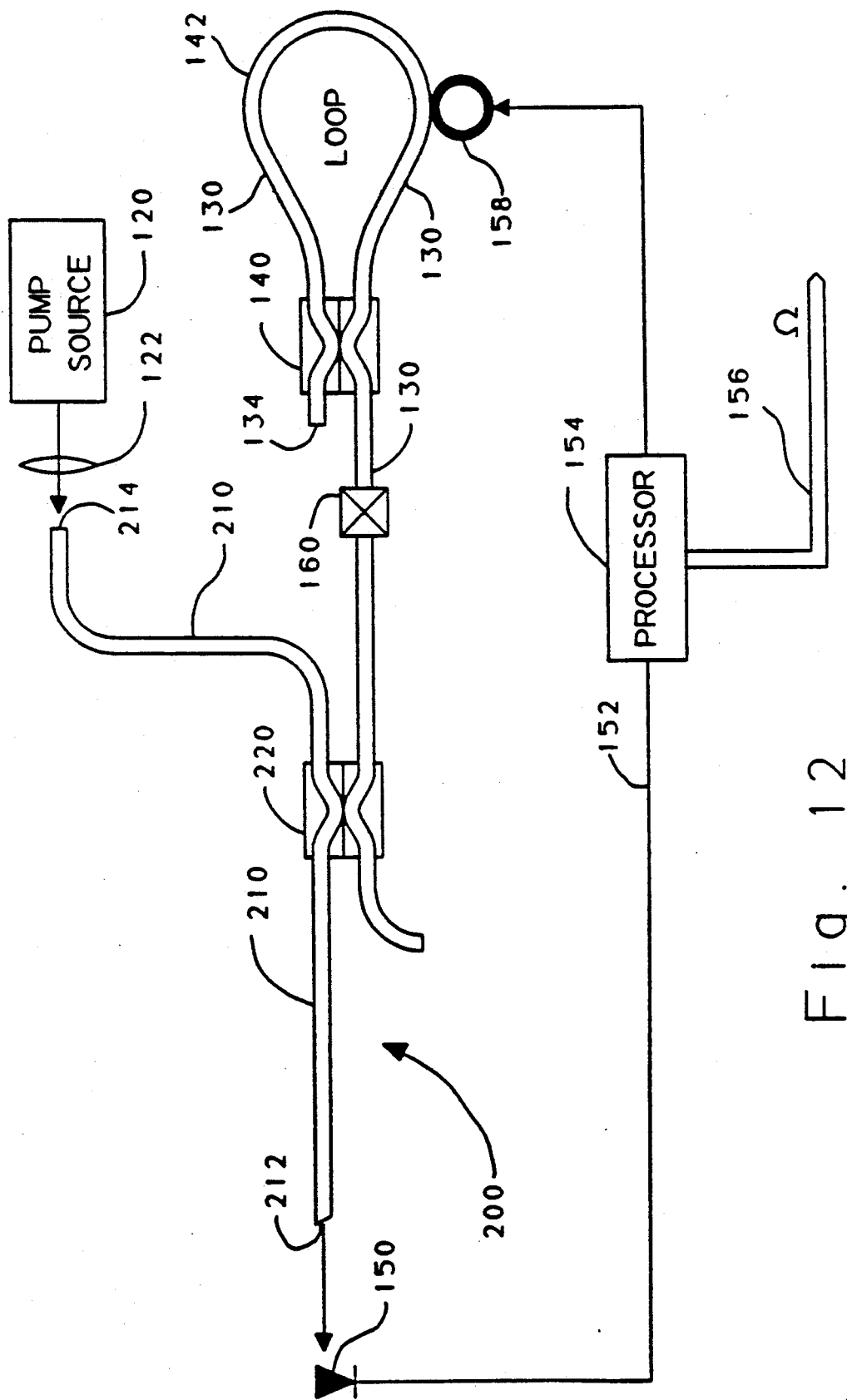
FIG. 12 is a pictorial representation of the Sagnac interferometer and the broadband light source of FIG. 3, wherein the photodetector is positioned to receive amplified light from the doped optical fiber.
Figure 13:
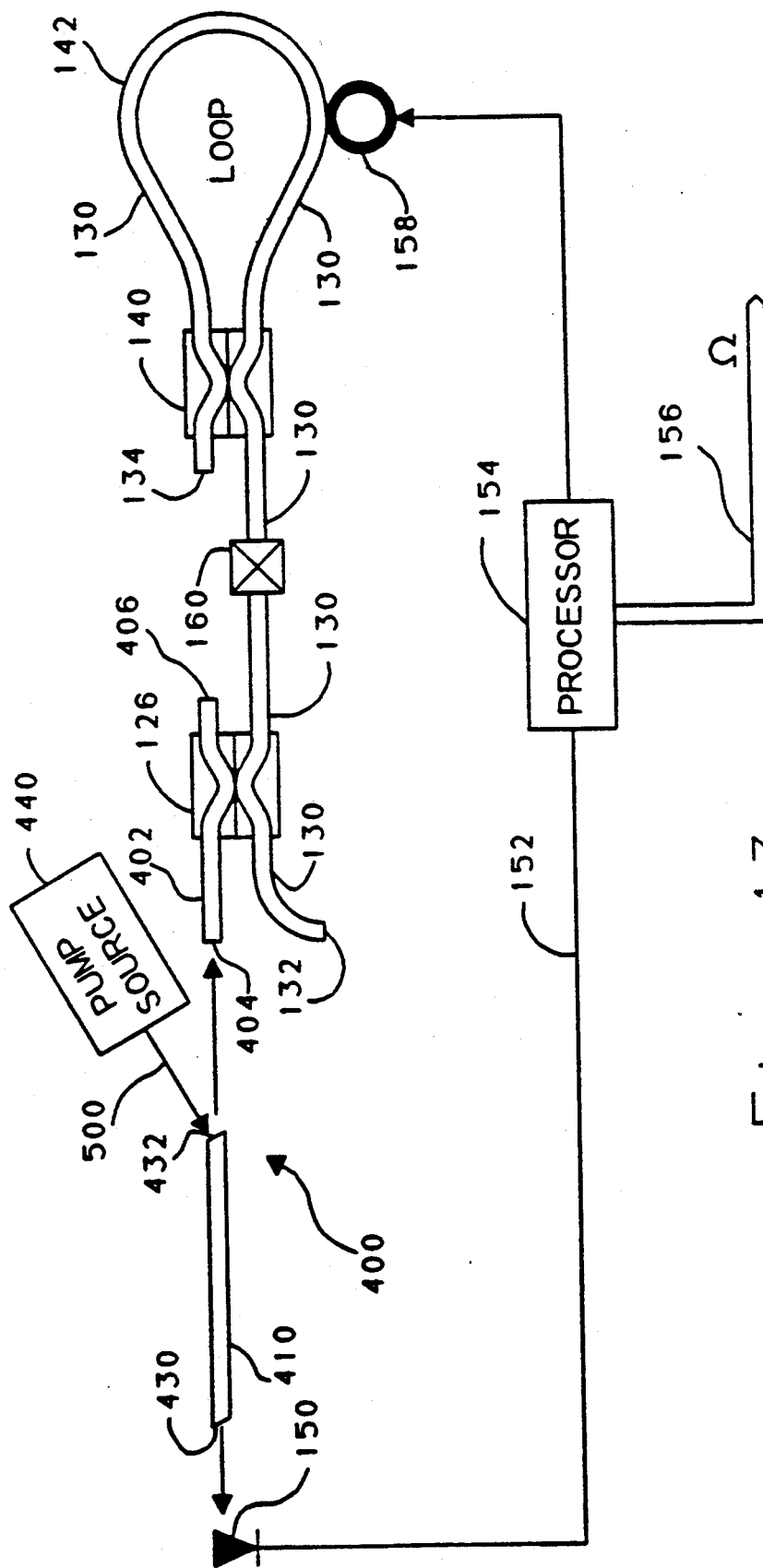
FIG. 13 is a pictorial representation of the Sagnac interferometer and the broadband light source of FIG. 9, wherein the photodetector is positioned to receive amplified light from the doped optical fiber.

FIGS. 12 and 13 correspond to FIGS. 3 and 9, respectively, with the photodetector 150 moved to the respective first ends of the fluorescing optical fibers 210 and 410. In each of the embodiments of FIGS. 12 and 13, the optical output signal from the interferometer is amplified within the fluorescing optical fiber to provide an amplified optical output signal to be detected by the photodetector 150.

One skilled in the art will appreciate that the embodiments of FIGS. 4, 5 and 8 can be similarly modified by positioning the photodetector 150 to receive the optical output signal after it has propagated through the double-clad optical fiber 400 in each embodiment. In addition, although the preferred embodiments were described in terms of a closed loop interferometer in which the detector output is used to drive the phase modulator, it will be recognized that the invention may be implemented in an open loop interferometer such as disclosed in U.S. Pat. Nos. 4,779,975 and 4,410,275.

It can be seen that the foregoing embodiments describe improved broadband light sources in which the possibilities of undesirable laser oscillation are substantially eliminated. Thus, desired broadband and temporally incoherent characteristics of the superfluorescent light generated by the light source are maintained. Although described above in connection with the preferred embodiments, it should be understood that modifications within the scope of the invention may be apparent to those skilled in the art, and all such modifications are intended to be within the scope of the appended claims.

What is claimed is:
1. An interferometer, comprising:
an optical loop;
a light source comprising an optical waveguide, said optical fiber waveguide comprising a material which emits an emitted broadband optical signal in response to pumping with pump radiation, said light source introducing said emitted optical signal to said optical loop along a connecting optical path extending between said light source and said optical loop, said loop returning at least a portion of light comprising said emitted optical signal back to said light source along said connecting optical path to provide a returning broadband optical signal, said light source being non-reflective for said returning optical signal to prevent said returning optical signal from being reflected back to said loop.

2. The interferometer as defined in claim 1, wherein said light source comprises a source of pump light coupled to optically pump said material such that said pump light propagates in said waveguide in a direction opposite to that of said emitted optical signal.

3. The interferometer as defined in claim 1, wherein said waveguide comprises an optical fiber having a core surrounded by a cladding and said light source comprises an optical source of pump light coupled to introduce light into said cladding.

4. The interferometer as defined in claim 3, wherein said optical fiber has a first numerical aperture corresponding to a first acceptance region and said cladding has a second numerical aperture corresponding to a second acceptance region, said acceptance regions defining an aperture window therebetween, said pump source introducing pump light into said aperture window.

5. The interferometer as defined in claim 1, additionally comprising a polarizer positioned in said connecting path such that both said emitted optical signal and said returning optical signal pass through said polarizer.

6. The interferometer as defined in claim 4, wherein said cladding has a non-circular cross section.

7. The interferometer as defined in claim 4, wherein said cross section is rectangular.

8. The interferometer as defined in claim 3, wherein said core of said optical fiber is single-mode and said cladding is multimode.

9. The interferometer as defined in claim 8, wherein said optical fiber is doped with neodymium.

10. The interferometer as defined in claim 1, wherein said optical loop comprises an optical waveguide having two polarization modes, said emitted optical signal having a coherence time which is significantly less than the propagation time difference between said modes after traversing the length of said loop.

11. The interferometer as defined in claim 1, wherein at least a portion of said returning optical signal propagates through said waveguide and exits said waveguide at an end thereof.

12. The interferometer as defined by claim 1, additionally comprising a photodetector for detecting said portion of said returning optical signal, said photodetector being disposed at said end of said waveguide and arranged to prevent light incident thereon from being reflected back to said loop.

13. The interferometer as defined in claim 1, wherein said waveguide comprises a fluorescent optical fiber.

14. An interferometer, comprising:
a light source comprising an optical waveguide having first and second ends, said optical fiber waveguide comprising a material which emits broadband light in response to optical pumping, said emitted light propagating toward said first end and said second end; and
an optical loop, optically coupled to (a) receive light propagating toward said first end of said optical waveguide and (b) return said emitted light to said optical waveguide to propagate toward said second end of said optical waveguide, said second end of said optical waveguide being arranged to output said emitted light non-reflectively from said waveguide to prevent emitted light that reaches said second end from being reflected back to said loop.

15. The interferometer of claim 14, wherein said light source comprises a source of pump light coupled to introduce pump light into said first end of said optical waveguide.

16. The interferometer of claim 15, wherein said pump light is input into said first end at an angle to the longitudinal axis of said optical waveguide.

17. The interferometer of claim 16, wherein said optical waveguide comprises a core surrounded by a cladding, and said pump light source is coupled to introduce the pump light into the cladding.

18. The interferometer of claim 14, wherein said waveguide comprises a fluorescent optical fiber.

19. An interferometer, comprising;
  an optical source comprising an optical waveguide having first and second ends, said optical waveguide comprising a material which emits light in response to optical pumping, said emitted light comprising first and second optical signals which propagate in opposite directions toward said first and second ends, respectively; and
  an interferometer loop coupled to receive said first optical signal propagating toward said first end of said optical waveguide, said second end of said optical waveguide being arranged to output said second optical signal non-reflectively to prevent said second optical signal from reaching said interferometer loop.

20. The interferometer of claim 19, wherein said waveguide comprises a fluorescent optical fiber.

21. A method of pumping an optical fiber comprising a material which will emit a light signal from an end of said fiber in response to optical pumping, said method comprising:
  directing a pump light beam into an end of said optical fiber;
  orienting said pump light beam so that the direction of propagation of the pump light beam at said end of said fiber is at an angle with respect to the direction of propagation of the light signal emitted from the end of said fiber.

22. A method of operating a Sagnac interferometer having a light source and an optical sensing loop, said light source comprising an optical waveguide comprising a material which will emit light, said sensing loop coupled to receive light from said optical waveguide, said method comprising:
  inputting pump radiation to the optical waveguide to pump said optical waveguide to emit broadband light;
  propagating emitted light from the light source towards the optical sensing loop; and
  propagating emitted light from the optical sensing loop towards the light source without returning the emitted light to the loop to prevent optical resonance of the emitted light in said interferometer.

23. The method of claim 22, wherein emitted light is emitted from a first end of said waveguide and wherein the step inputting pump radiation comprises coupling optical pump energy to the waveguide at locations between the sensing loop and a second end of the waveguide.

24. The method of claim 22, additionally comprising the step of passing emitted light propagating from the loop to the light source through the waveguide to provide amplified light, and detecting the amplified light.

* * * * *